(12) United States Patent
Davin et al.

(10) Patent No.: US 10,486,389 B2
(45) Date of Patent: Nov. 26, 2019

(54) LASER-PERFORATED METAL HONEYCOMB MATERIAL AND METHOD OF MANUFACTURING SAME

(71) Applicant: Space Exploration Technologies Corp., Hawthorne, CA (US)

(72) Inventors: Christopher Davin, Playa Vista, CA (US); William B. Riley, Torrance, CA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 315 days.

(21) Appl. No.: 15/286,478

(22) Filed: Oct. 5, 2016

(65) Prior Publication Data

US 2018/0093443 A1     Apr. 5, 2018

(51) Int. Cl.
*B32B 3/12*      (2006.01)
*B32B 37/14*    (2006.01)
(Continued)

(52) U.S. Cl.
CPC ............ *B32B 3/12* (2013.01); *B32B 3/266* (2013.01); *B32B 15/00* (2013.01); *B32B 37/146* (2013.01); *B32B 38/0004* (2013.01); *B32B 37/0076* (2013.01); *B32B 37/1292* (2013.01); *B32B 2311/00* (2013.01); *F01N 3/2814* (2013.01);
(Continued)

(58) Field of Classification Search
CPC ..... B32B 3/12; B32B 37/146; B32B 38/0004; B32B 37/0076; B32B 2311/00; B32B 37/1292; F01N 2330/04; F01N 3/2814; F01N 3/2821; F01N 2330/02
See application file for complete search history.

(56) References Cited

U.S. PATENT DOCUMENTS 3,895,152 A * 7/1975 Carlson ................. B65D 90/06
                                                              428/116
5,306,890 A * 4/1994 Minamida ............. B21D 47/00
                                                              219/121.64
(Continued)

FOREIGN PATENT DOCUMENTS

WO     WO-2016042107 A1 *  3/2016 ............. B21D 47/00

OTHER PUBLICATIONS

HexWeb® Rigicell™ Corrosion Resistant Aluminum Corrugated Honeycomb, Product Data, Hexcel Composites, <http://www.hexcel.com/user_area/content_media/raw/Rigicell_us.pdf> [retrieved Oct. 12, 2017], 4 pages.
(Continued)

*Primary Examiner* — Vishal I Patel
(74) *Attorney, Agent, or Firm* — Polsinelli PC

(57) ABSTRACT

In one embodiment of the present disclosure, a method of manufacturing perforated metal honeycomb material includes: printing a roll of metal foil with adhesive; laser perforating the roll of metal foil to provide a plurality of holes in the metal foil; sheeting the printed and perforated roll of metal foil into a plurality of stacked sheets; and laminating the sheets of metal foil into a honeycomb before expansion block (HOBE). In another embodiment of the present disclosure, a perforated metal honeycomb structure includes a metal honeycomb structure having a plurality of laser-drilled holes wherein at least some of the plurality of holes are non-uniform in size, shape, and/or spacing between holes.

18 Claims, 20 Drawing Sheets

(51) Int. Cl.
| | |
|---|---|
| *B32B 38/00* | (2006.01) |
| *B32B 15/00* | (2006.01) |
| *B32B 3/26* | (2006.01) |
| B32B 37/00 | (2006.01) |
| B32B 37/12 | (2006.01) |
| F01N 3/28 | (2006.01) |

(52) U.S. Cl.
CPC ........ *F01N 3/2821* (2013.01); *F01N 2330/02* (2013.01); *F01N 2330/04* (2013.01)

(56) References Cited

U.S. PATENT DOCUMENTS

| 5,550,346 A * | 8/1996 | Andriash | B23K 26/08 |
| | | | 219/121.72 |
| 2017/0259520 A1* | 9/2017 | Alter | B21D 47/00 |

OTHER PUBLICATIONS

HexWeb Honeycomb Attributes and Properties, A Comprehensive Guide to Standard Hexcel Honeycomb Materials, Configurations, and Mechanical Properties, Hexcel Composites, <https://www.pccomposites.com/wp-content/uploads/2015/07/PCHC4-4TY4_TDS.pdf> [retrieved Oct. 12, 2017], 40 pages.

* cited by examiner

LASER-PERFORATED METAL HONEYCOMB MATERIAL AND METHOD OF MANUFACTURING SAME

BACKGROUND

Aluminum honeycomb is a common engineering material, which can be used as core material in sandwich structures having low density and high shear and compressive strength-to-weight ratios. In some applications, the honeycomb structure may include perforations to provide manufacturing and performance advantages. In previously developed honeycomb manufacturing, such perforations were achieved through a mechanical pin perforation processes. However, there is a need for improved perforation methods and resultant perforated honeycomb materials.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present disclosure are directed to fulfilling the need for improved perforation methods and resultant perforated metal honeycomb materials and other needs.

In accordance with one embodiment of the present disclosure, a method of manufacturing perforated metal honeycomb material is provided. The method includes: printing a roll of metal foil with adhesive; laser perforating the roll of metal foil to provide a plurality of holes in the metal foil; sheeting the printed and perforated roll of metal foil into a plurality of stacked sheets; and laminating the sheets of metal foil into a honeycomb before expansion block (HOBE).

In accordance with another embodiment of the present disclosure, a method of manufacturing perforated metal honeycomb material is provided. The method includes: printing a roll of metal foil with adhesive; laser perforating the roll of metal foil to provide a plurality of holes in the metal foil; sheeting the printed and perforated roll of metal foil into a plurality of stacked sheets; laminating the sheets of metal foil into a honeycomb before expansion block (HOBE); cutting the HOBE block into a plurality of HOBE slices; and expanding the HOBE slices into expanded honeycomb structures having a plurality of perforations.

In accordance with another embodiment of the present disclosure, a perforated metal honeycomb structure is provided. The perforated metal honeycomb structure includes a metal honeycomb structure having a plurality of laser-drilled holes wherein at least some of the plurality of holes are non-uniform in second, shape, and/or spacing between holes.

In any of the embodiments described herein, a method of manufacture may further include cutting the HOBE block into a plurality of HOBE slices.

In any of the embodiments described herein, a method of manufacture may further include expanding the HOBE slices into expanded honeycomb structures having a plurality of perforations.

In any of the embodiments described herein, the roll of metal foil may be printed with adhesive prior to laser perforation.

In any of the embodiments described herein, the roll of metal foil may be printed with adhesive after laser perforation.

In any of the embodiments described herein, at least some of the plurality of holes may be larger than 0.10 mm in diameter.

In any of the embodiments described herein, at least some of the plurality of holes may be non-uniform in size and/or shape.

In any of the embodiments described herein, the spacing between at least some of the plurality of holes may be non-uniform.

In any of the embodiments described herein, a method of manufacture may further include corrugating the roll of metal foil to produce a corrugated honeycomb structure.

In any of the embodiments described herein, a method of manufacturing perforated metal honeycomb material does not include the process step of compression of the metal foil after the perforation process step.

In any of the embodiments described herein, a perforated metal honeycomb structure may include at least first and second laser-drilled holes, wherein the first and second holes are different from each other.

In any of the embodiments described herein, at least some of the plurality of holes may be larger than 0.10 mm in diameter.

In any of the embodiments described herein, the first hole may have a first size and the second hole may have a second size different from the first size.

In any of the embodiments described herein, the first hole may have a first shape and the second hole may have a second shape different from the first shape.

In any of the embodiments described herein, a perforated metal honeycomb structure may include a third hole, wherein the first hole has a first spacing from the third hole and the second hole has a second spacing from the third hole different from the first spacing.

In any of the embodiments described herein, the honeycomb structure may be expanded.

In any of the embodiments described herein, the honeycomb structure may be HOBE.

In any of the embodiments described herein, the honeycomb structure may be corrugated.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

The detailed description set forth below in connection with the appended drawings, in which like numerals reference like elements, is intended as a description of various embodiments of the disclosed subject matter and is not intended to represent the only embodiments. Each embodiment described in this disclosure is provided merely as an example or illustration and is not to be construed as preferred or advantageous over other embodiments. The illustrative examples provided herein are not intended to be exhaustive or to limit the claimed subject matter to the precise forms disclosed.

In the following description, numerous specific details are set forth to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. In addition, it will be appreciated that embodiments of the present disclosure may employ any combination of features described herein. Further, the process steps disclosed herein may be carried out serially or in parallel where applicable, or can be carried out in a different order.

The present disclosure may include references to directions, such as "forward," "rearward," "front," "back," "upward," "downward," "lateral," "medial," "in," "out," "extended," "advanced," "retracted," "vertical," "horizontal," "proximal," "distal," "central," etc. These references, and other similar references in the present disclosure, are only to assist in helping describe and understand the particular embodiment and are not intended to limit the present disclosure to these directions or locations. The present disclosure may also reference quantities and numbers. Unless specifically stated, such quantities and numbers are not to be considered restrictive, but representative of the possible quantities or numbers associated with the present disclosure. Also in this regard, the present disclosure may use the term "plurality" to reference a quantity or number. In this regard, the term "plurality" is meant to be any number that is more than one, for example, two, three, four, five, etc. In an embodiment, "about," "approximately," etc., means plus or minus 5% of the stated value.

Figure 1:
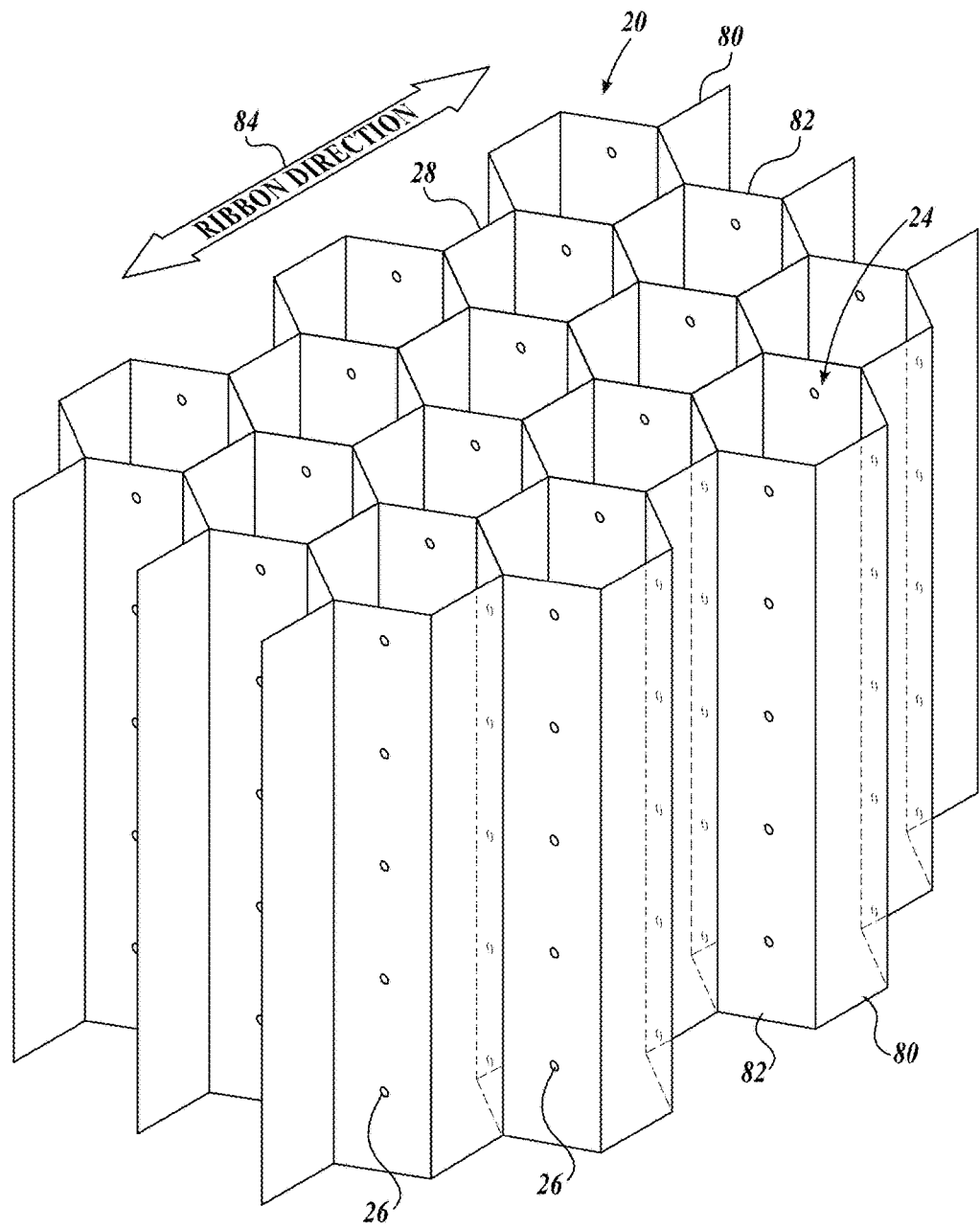
FIG. 1 is a perspective view of a perforated metal honeycomb in accordance with one embodiment of the present disclosure.

Embodiments of the present disclosure are directed to metal honeycomb materials and methods of manufacturing metal honeycomb materials having a plurality of perforations in the honeycomb structure. Referring to FIG. 1, one embodiment of a perforated honeycomb structure 20 made from a metal foil 22 defining a plurality of cells 24 and a plurality of intercellular holes 26 is shown.

In accordance with embodiments of the present disclosure, the metal foil 22 may be, for example, aluminum alloy, titanium alloy, stainless steel, or any other suitable metal or metal alloy. Aluminum honeycomb, for example, formed from 5052 and 5056 aluminum alloys, have been used in aerospace applications for many years. Aluminum honeycomb begins as a roll of aluminum foil (for example, having a thickness of between about 0.0007 inches and about 0.003 inches, up to about 0.006 inches in some uncommon materials) and goes through various stages of processing to create the final product.

Figure 2:
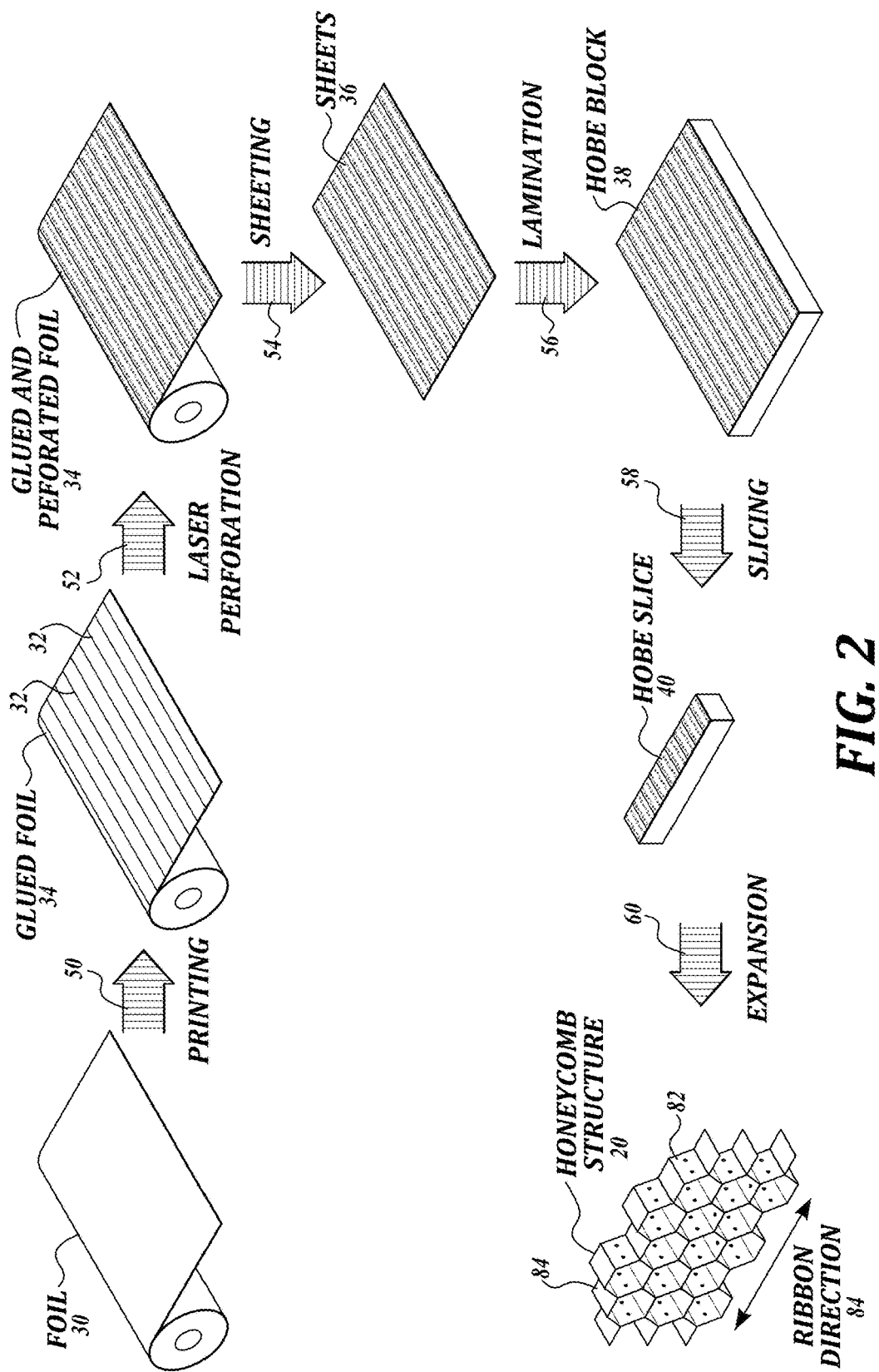
FIG. 2 is a process diagram for making perforated metal honeycomb in accordance with one embodiment of the present disclosure.

Referring to FIG. 2, the processing steps for making a metal honeycomb structure 20 include printing a roll of metal foil 30 with lines of adhesive 32 using a printing method, as indicated by arrow 50, and perforating the roll of metal foil 30 with a plurality of holes 26 using a laser-drilling method, as indicated by arrow 52.

Still referring to FIG. 2, after the roll of metal foil has been printed with lines of adhesive 32 and laser-drilled with a plurality of holes 26, the printed and perforated roll of metal foil 34 is sheeted into a plurality of stacked sheets 36 using a sheeting method, as indicated by arrow 54. The stack of sheets 36 is laminated together along the lines of adhesive 32 using, for example, heat and pressure, into a honeycomb-before-expansion (HOBE) block 38 using a lamination method, as indicated by arrow 56.

The HOBE block is then cut into a plurality of HOBE slices 40 using a slicing method, as indicated by arrow 58, and the HOBE slices are expanded into an expanded honeycomb structure 20 using an expansion method, as indicated by arrow 60. In the expanded honeycomb structure 20 having a ribbon direction 84, holes 26 are shown through the free walls 82, but not through the node (or adhered) walls 80. See also FIG. 1 for an enlarged view of the honeycomb structure 20.

In accordance with embodiments of the present disclosure, the metal honeycomb structure 20 of FIG. 1 is an "expanded" material, referring to the final step of processing. The expanded honeycomb structure 20 can be used in sandwich structures having first and second outer layers (not shown), such as composite face sheets, which are adhered to the two hexagonal-pattern face sides 28 of the honeycomb structure.

Intercellular holes 26 in a honeycomb structure 20 are desirable for at least two reasons. A first benefit of intercellular holes 26 is achieved during manufacture of a sandwich structure (not shown) incorporating a perforated honeycomb structure 20 between two outer layers. Sandwich structures are typically made by a vacuum-bagging process. By allowing trapped air in the cells 24 to flow out of the honeycomb structure 20, a larger pressure compacts the outer layers together, resulting in better material properties and a stronger sandwich structure. Small perforations, such as the holes mechanically punched in previously developed processes, usually allow sufficient air flow for manufacture of the sandwich structure. Larger holes, however, may increase the efficiency of this process.

The second benefit of intercellular holes 26 is achieved in use in aerospace applications. For example, in launch vehicle and spacecraft applications, when a sandwich structure rapidly ascends from inside Earth's atmosphere into space, trapped air inside the cells 24 of the honeycomb structure 20 will try to blow apart the sandwich structure from inside, because there is no opposing air pressure on the outside of the sandwich structure in outer space. Normally, the adhesive holding the sandwich structure together is strong enough to hold against this pressure. But, if there is an area of weak bond or no bond between the honeycomb core 20 and the sandwich outer layers, the pressure differential can cause the local area to balloon out, which can be a location for failure of the sandwich panel. The same problem applies to aircraft during ascent to altitude where the surrounding air pressure is reduced. This failure mode can be a cause of structural failure in both spacecraft and aircraft, and has been implicated in the failure of various components of each, in testing and flight.

Weak bonds in sandwich structures are difficult to screen for, because it is hard to replicate the flight environment for these sandwich structures on the ground. Smaller structures can be tested in a vacuum chamber, but larger structures like fairings and interstages are more difficult to test, requiring a very large and rapidly purging vacuum chamber. Such testing would need to be performed on every flight article, adding high cost and a long schedule for processing.

Other options for reducing the risk of failure of the sandwich structures include: (1) using pressurized air pumped inside the sandwich structure during ground testing, to simulate the pressure differential; (2) drilling holes or leaving exposed edges of the sandwich structure such that during ascent, the trapped air can flow out and have a significantly lower pressure differential during flight; and/or (3) using a vacuum pump on the launch pad to evacuate the trapped air just prior to lift-off. These options are possible with larger vent holes in the honeycomb structure than the previously developed processes are capable of producing. Methods of laser perforating are capable of achieving larger vent holes for launch and flight scenarios.

In accordance with embodiments of the present disclosure, laser perforations 26 in the roll of perforated metal foil 34 may be formed using a suitable laser, for example, a green (GR), ultraviolet (UV) laser, or infrared (IR) laser.

As a non-limiting example, laser drilling using a GR laser may be at lower power, for example, about 20 W, and the hole is traced in the aluminum foil, which is a preferable method for larger-sized holes.

As another non-limiting example, laser drilling using a UV laser may be at a higher power than a GR laser, for example, about 24 W.

As another non-limiting example, laser drilling may be at about 100 W, and the holes are vaporized in the middle of the hole, which may be a preferable method for smaller-sized holes.

Data for GR, UV, and IR laser drilling is provided below in EXAMPLES 1-3 and respective corresponding figures, FIGS. 7-10B, FIGS. 11-14B, and FIGS. 15A-17B. Comparative results of the laser drilling processes are provided in EXAMPLE 4. The result of laser perforating the metal foil is an array of holes 26 between the hexagonal cells 24 in the honeycomb structure 20, as can be seen in FIG. 1.

Parameters that can be controlled by a laser perforation program include beam delivery, such as focusing optics, scanning patter, and scan speeds. Therefore, the size and shape of holes drilled in the metal foil can be controlled. Likewise, the holes can be laser drilled in any pattern desired, and such patterns may have strength advantages over a simple grid pattern. For example, specific parts to be manufactured may be designed with specific hole size or spacing in either the web direction or the feed direction of the roll of metal foil to optimize air flow through the specific parts during manufacture and in flight.

In one embodiment of the present disclosure, hole diameter is in the range of about 0.2 mm to about 1.5 mm, which is larger than the typical punched hole diameter of 0.05 mm to about 0.10 mm in diameter. In another embodiment, hole diameter is greater than 0.1 mm. In another embodiment, hole diameter is greater than 0.2 mm.

Figure 3:
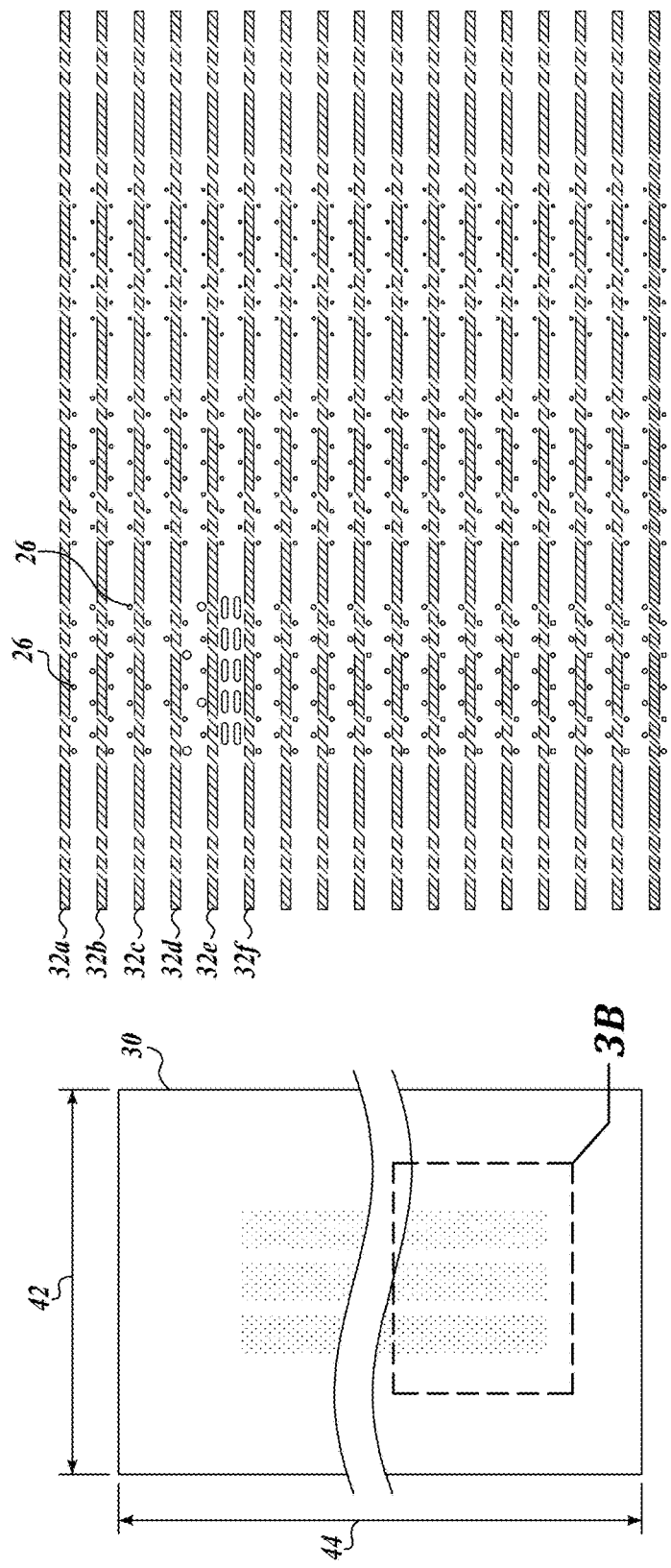
FIGS. 3A and 3B are top views of a perforated metal foil roll illustrating perforations made by a representative laser-drilled perforation process in accordance with one embodiment of the present disclosure.

Referring to FIGS. 3A and 3B, an array of laser-drilled holes 26 in a portion of a metal roll 34 or metal sheet 36 is provided, the metal sheet having a web direction 42 and a feed direction 44. As seen in FIG. 3B, the holes 26 are laser drilled in multiple sizes and/or shapes in patterns between glue lines 32 extending in the web direction 42. (Of note, glue lines are not shown in FIG. 3A.) For example, between adhesive lines 32c and 32d, the spacing of the holes 26 is different from the spacing between adhesive lines 32b and 32c. Between adhesive lines 32d and 32e, some of the holes are of a different size. Between adhesive lines 32e and 32f, some of the holes are of a different shape. These arrays of holes are provided as non-limiting examples. Other hole spacing, hole size, and hole shapes are within the scope of the present disclosure. Variations in hole spacing, hole size, and hole shapes may add to material strength, material venting, or other advantageous properties for the honeycomb structure.

By performing the laser perforation process after printing adhesive lines 32, as shown in FIG. 2, the holes 26 can be located relative to the adhesive lines 32, providing control of the location of the holes 26 in the finished honeycomb structure 20 (see FIG. 1). Such placement can be achieved by use of, for example, an optical sensor.

Holes 26 placed within adhesive lines 32 end up after the lamination process as holes through the stronger, bonded, double-thickness node walls of the honeycomb structure 20. In contrast, holes 26 placed between adhesive lines 32 after lamination end up as holes in the honeycomb structure 20 through the weaker, un-bonded free walls (see FIG. 1). For strength considerations, holes 26 are typically laser drilled through the free walls of the honeycomb structure 20. However, holes through the adhesive lines are also within the scope of the present disclosure.

Although shown in the process diagram of FIG. 2 as being printed with adhesive lines prior to laser perforation, laser perforating the metal foil roll prior to gluing is also within the scope of the present disclosure.

Figure 4:
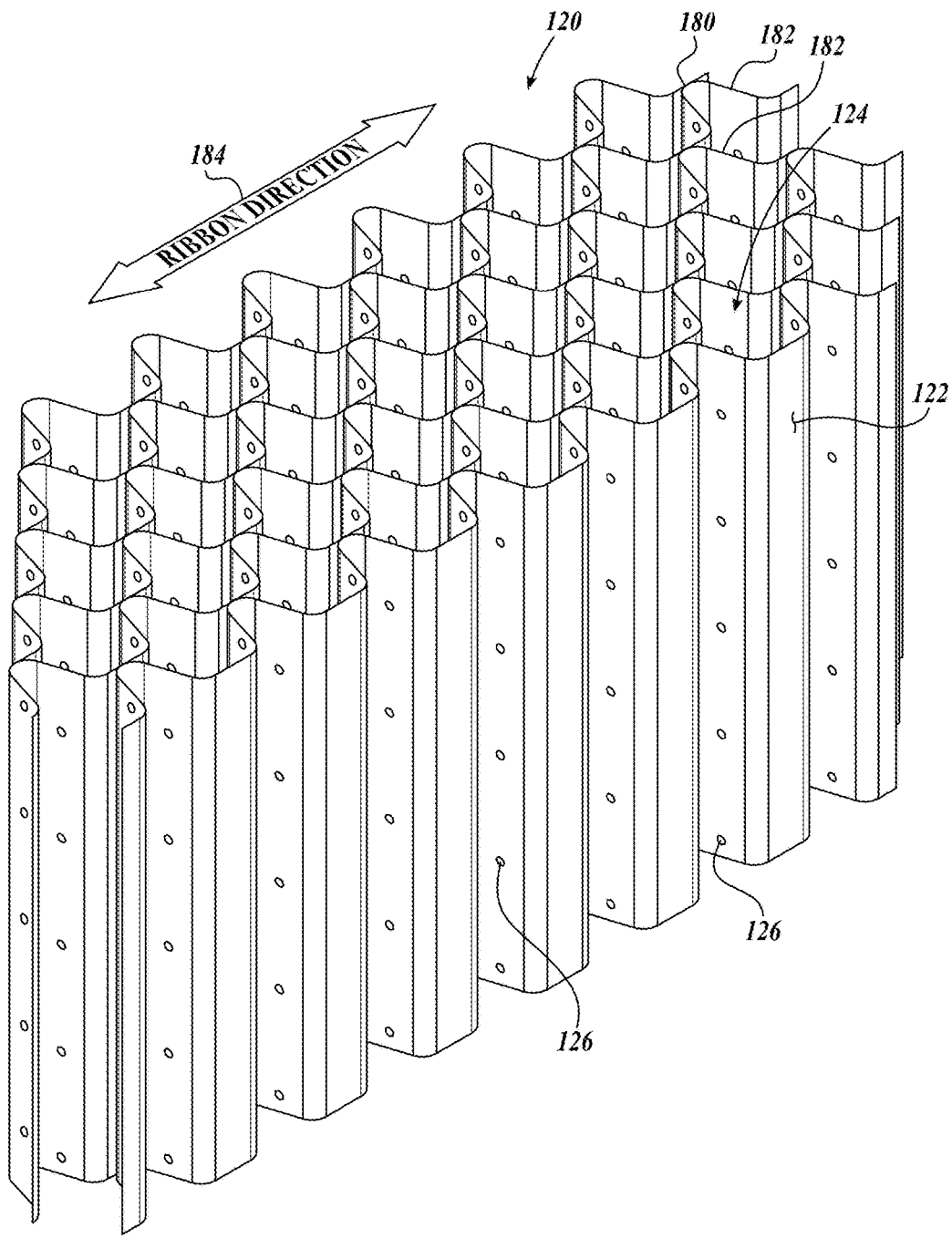
FIG. 4 is a perspective view of a perforated and corrugated metal honeycomb in accordance with another embodiment of the present disclosure.
Figure 5:
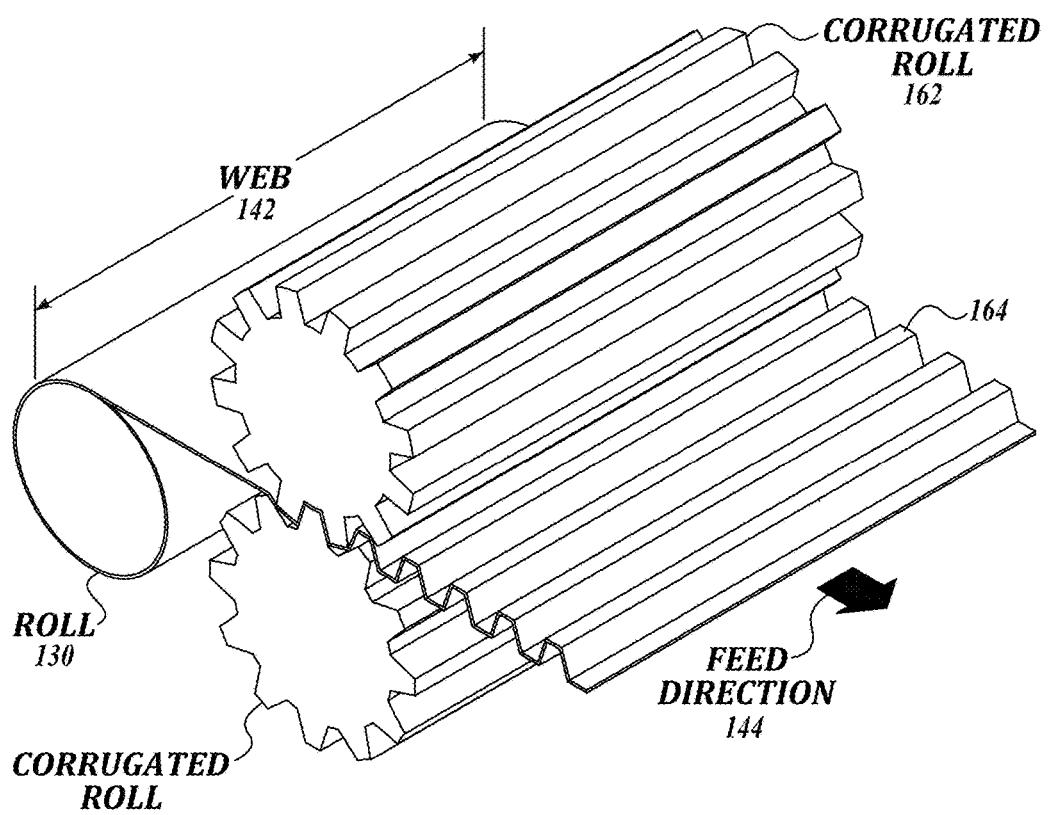
FIG. 5 is a process diagram for a corrugation process step, which can be added to one or more process steps in FIG. 2, for making a perforated and corrugated metal honeycomb in accordance with embodiments of the present disclosure.

Referring to FIGS. 4 and 5, embodiments of the present disclosure may include corrugated metal honeycomb processes and structure. The corrugated metal honeycomb structure and process to manufacture such honeycomb is substantially similar to the honeycomb structure 20 and some steps in the process described in FIGS. 1-3, except for differences in the corrugation of the metal foil. Similar reference numeral numbers are used in FIGS. 4 and 5 as used in FIGS. 1-3, except in the 100 series.

Referring to FIG. 4, a corrugated honeycomb structure 120 is provided including a plurality of cells 124 and a plurality of intercellular holes 126.

In the process diagram of FIG. 5, the roll of metal foil 130 is corrugated by a corrugated press including first and second corrugated rolls 162 and 162 to produce a corrugated metal foil 164. In the illustrated embodiment, such corrugation of the roll of metal foil 130 occurs prior to the printing and perforating process steps shown in the process described in FIG. 2. After corrugation, lines of adhesive and laser-drilled holes can be strategically placed to result in a desired array of holes in the corrugated honeycomb structure 120 (see FIG. 4). In other embodiments, corrugation may occur after the printing and perforating process steps, or between the printing and perforating process steps. In some embodiments, the material may undergo an expansion process after corrugation and lamination, and in others there may be a corrugation process with no expansion process.

The previously developed process will now be described with reference to FIG. 6. Similar reference numeral numbers are used to describe the previously developed process of FIG. 6 as are used to describe the process of the present disclosure in FIG. 1, except in the 200 series.

Figure 6:
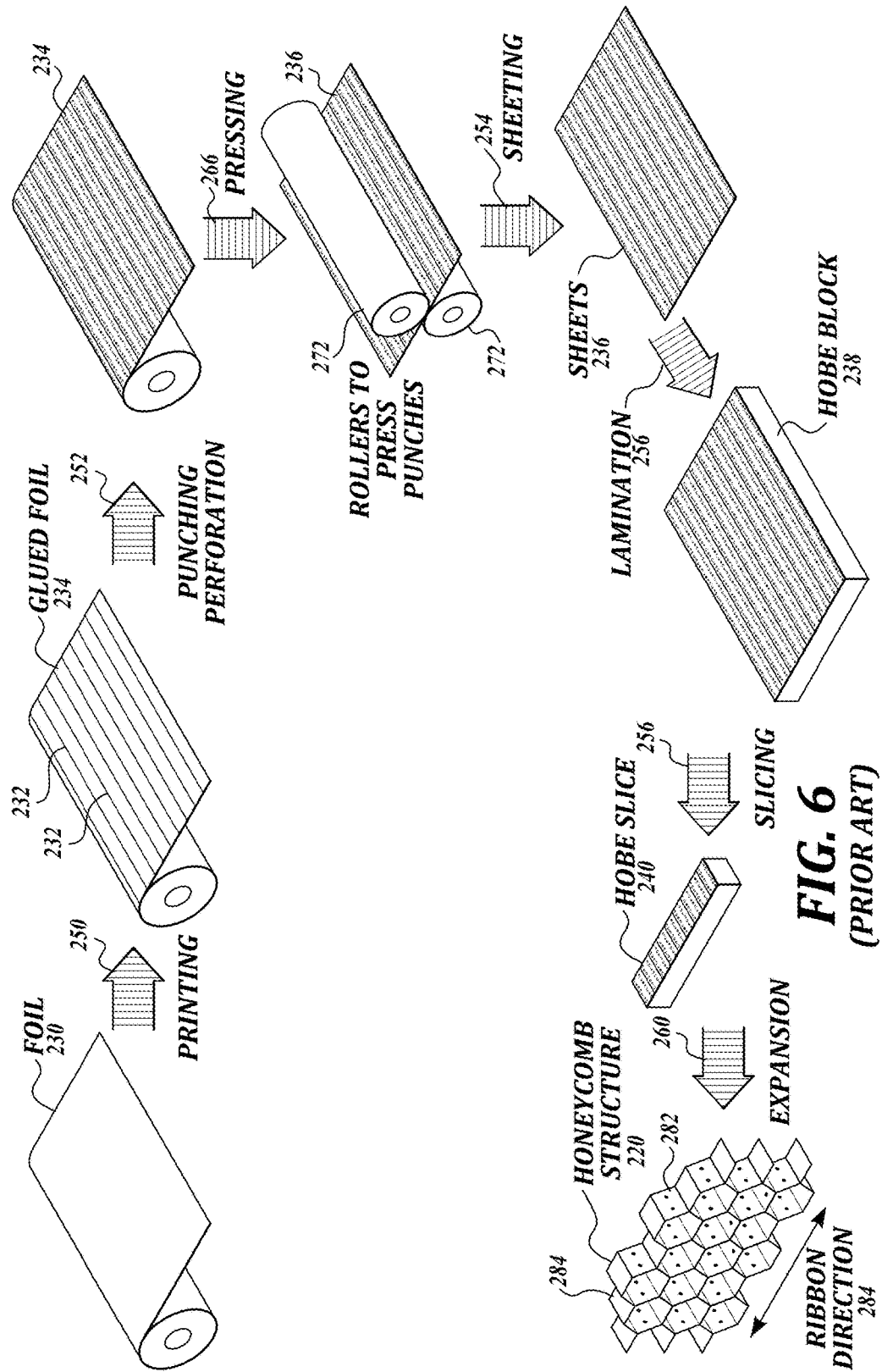
FIG. 6 is a process diagram for making perforated metal honeycomb in accordance with a previously developed process.

Referring to FIG. 6, in a previously developed process, perforation of a metal honeycomb structure 220 is achieved by running the roll of adhesive printed foil 234 through a mechanical perforation process, as indicated by arrow 252. In the mechanical perforation process, two sets of drums to mechanically perforate the roll of foil 234. The first set of drums pokes holes in the foil 234, with one drum having steel spikes and the other drum being coated in rubber. This process produces holes in the material but also creates volcano-shaped dimples. For the sheets to sit flat for lamination, the foil 234 is passed through an additional set of steel rollers 272 to compress the dimples back down. The pressing process is indicated by arrow 266. The result is a series of small, uniform holes in the range of about 0.050 mm (0.0020 in) to about 0.10 mm (0.0040 in) in diameter.

Figure 18:
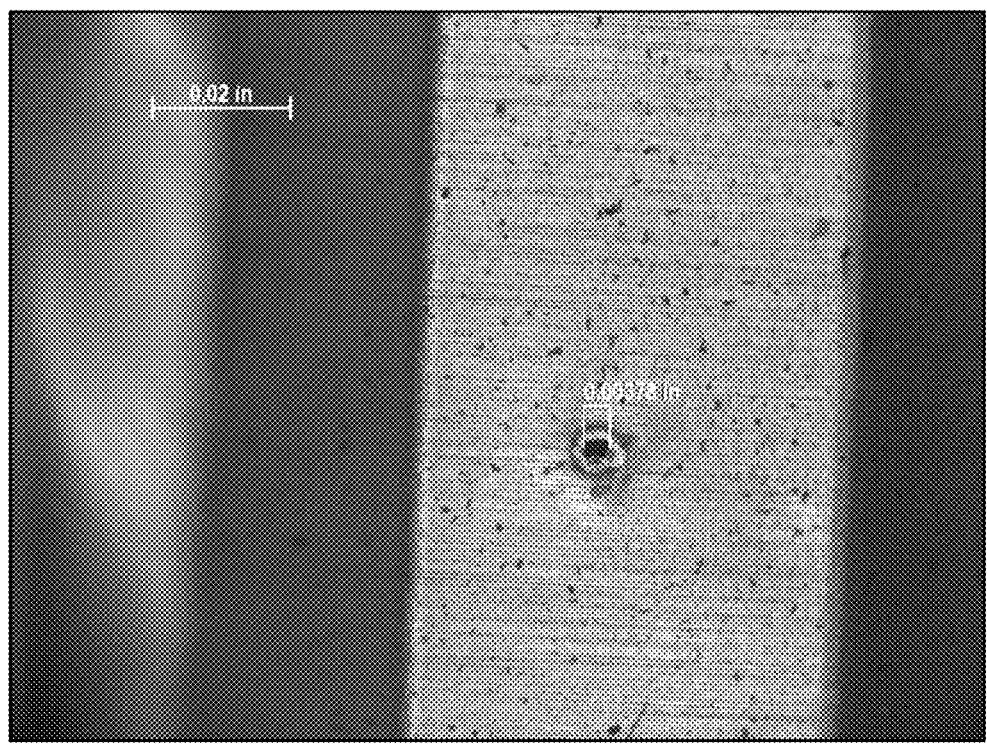
FIGS. 18-20 are magnified images of holes made using the previously developed mechanical pin perforation process described in FIG. 6.
Figure 19:
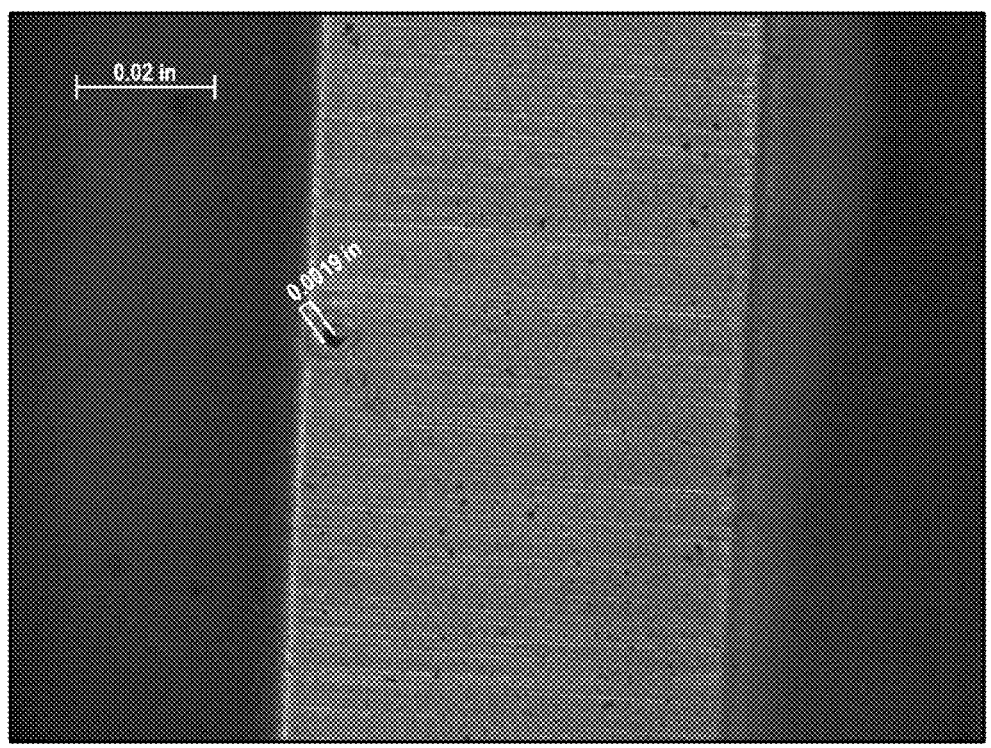
Figure 20:
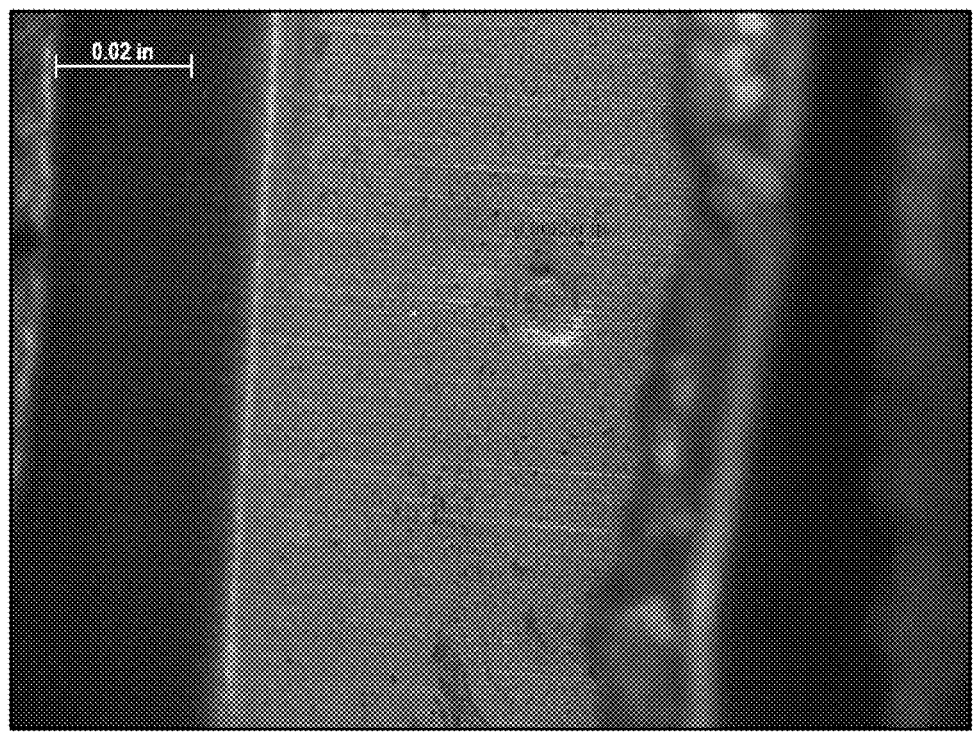

Quality control is difficult in the previously developed process. Some material is dimpled but not penetrated by the perforation spikes. In addition, the process is not scalable to achieve holes of larger sizes. Because the foil must be flattened back down, the use of larger perforation spikes does not necessarily result in larger holes in the finished product. FIGS. 18-20 show magnified images resulting from exemplary mechanical perforation processes, as discussed in EXAMPLE 5 below.

Embodiments of the present disclosure are directed to processes for manufacturing metal honeycomb material including high quality and potentially larger and non-uniform in size, shape and/or spacing of intercellular holes in the material, as compared to honeycomb material manufactured by the previously developed processes. In addition, processes designed in accordance with embodiments of the present disclosure may remove the process step from the previously developed process of compression after mechanical perforation to press the dimples back down (as indicated by arrow 266 in FIG. 6).

One advantageous effect of the processes described herein is that by removing a piece of material through the laser perforation process, instead of mechanically perforating a hole in the previously developed process, arbitrarily large holes can be produced and the foil can still sit flat for lamination.

Another advantageous effect of the processes described herein is that laser machines are able to drill holes at a higher speed than the speed achieved by mechanically perforating in the previously developed process. As a non-limiting example, laser drilling can drill in excess of 500 holes per second by rapidly pulsing the laser and using a small articulated mirror to sweep the beam across the foil.

Another advantageous effect of the processes described herein is that hole size, shape, and/or spacing of the holes can be changed with reprogramming, which is an advantage over mechanical perforation processes.

Testing on aluminum foil has shown laser drilling can produce quality holes, with precise shape and positional control, a minimal heat-affected zone (HAZ), and very small slag drips on the back side of the foil. Common materials used in metal honeycomb structures include 5052 and 5056 aluminum alloys, which are not heat-treated alloys. Despite minimal HAZ, the strength of these alloys is less affected by heating than other alloys, resulting in a smaller reduction in strength from the drilling process than for a heat-treated alloy.

The EXAMPLES below are directed to experimental data for GR, UV, and IR laser drilling of aluminum alloy foil having a thickness of 63.5 microns, and an assessment of the previously developed process for comparison.

Example 1: GR Laser Drilling

Figure 7:
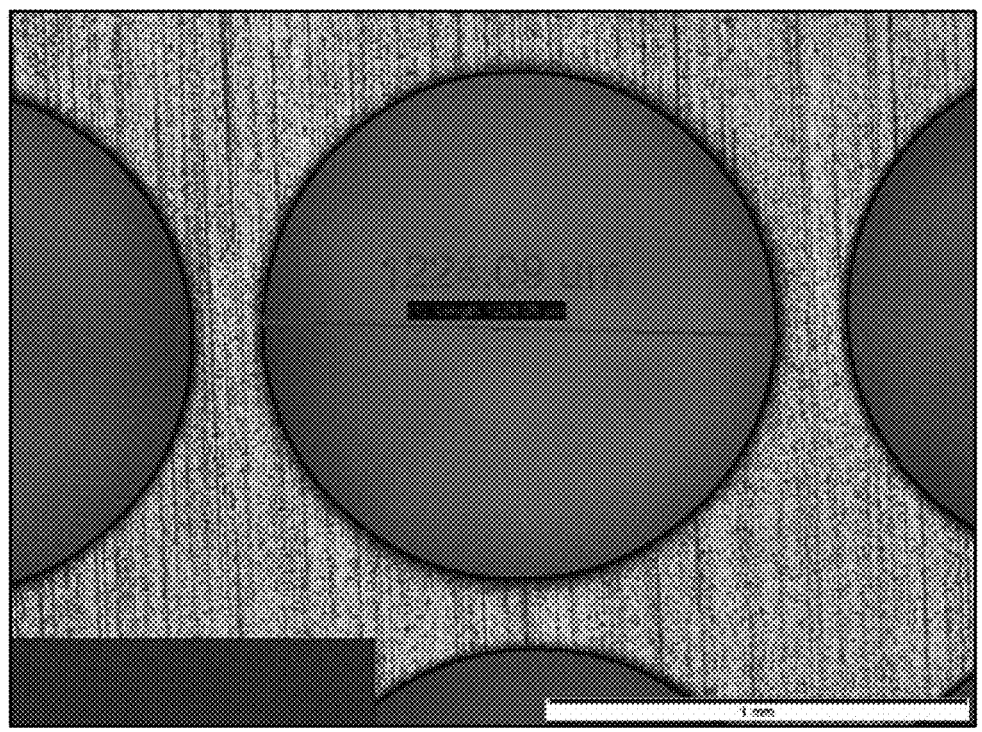
FIGS. 7-10B are magnified images of representative holes drilled using a representative GR laser drilling process.
Figure 8:
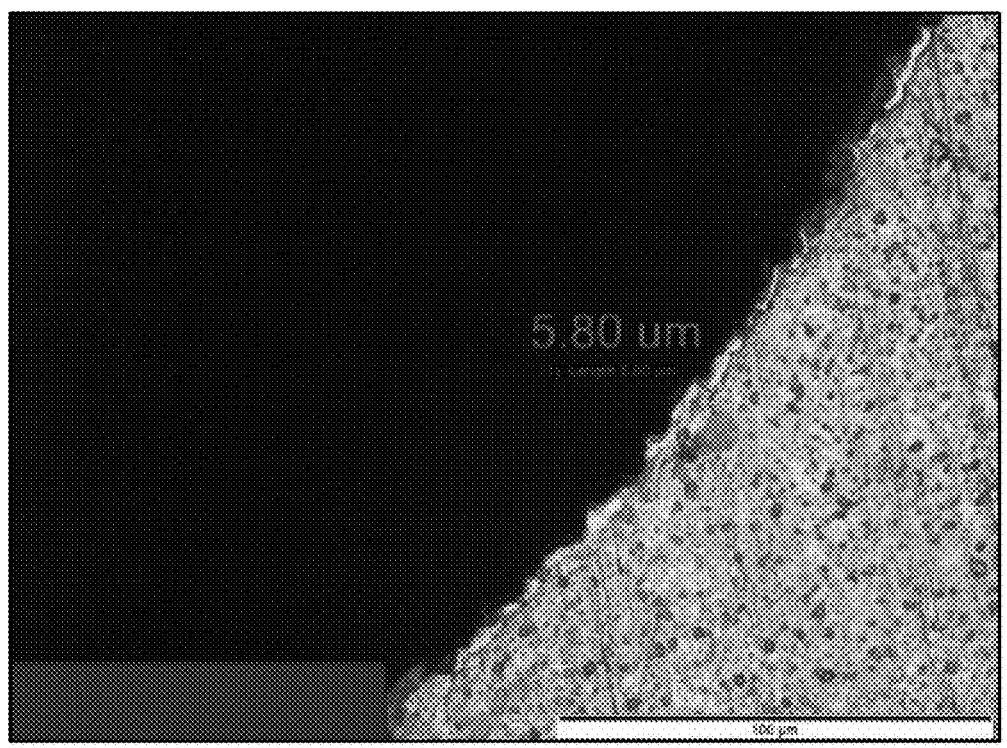
Figure 9:
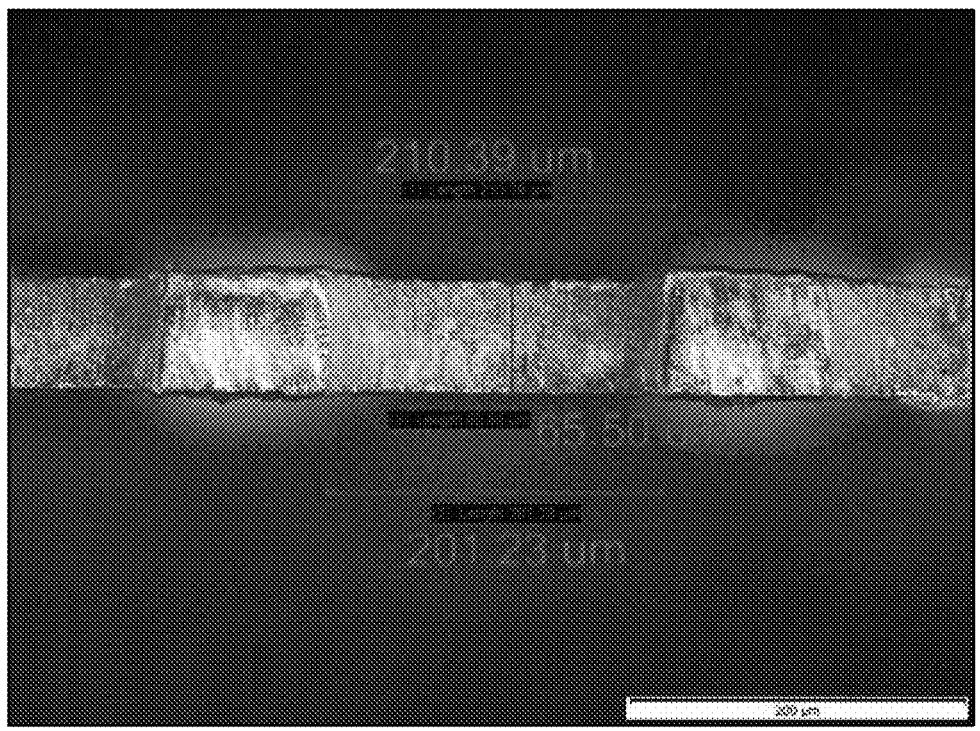
Figure 10A:
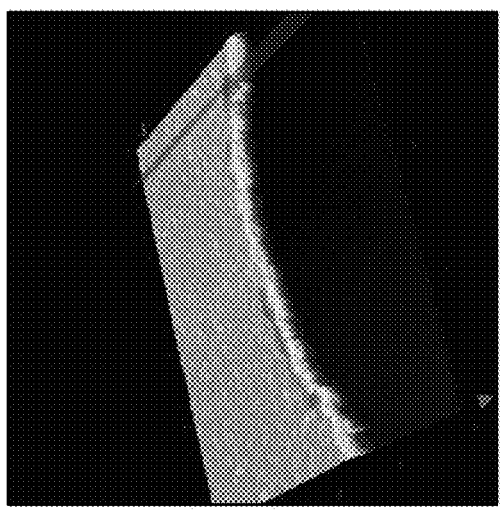
Figure 10B:
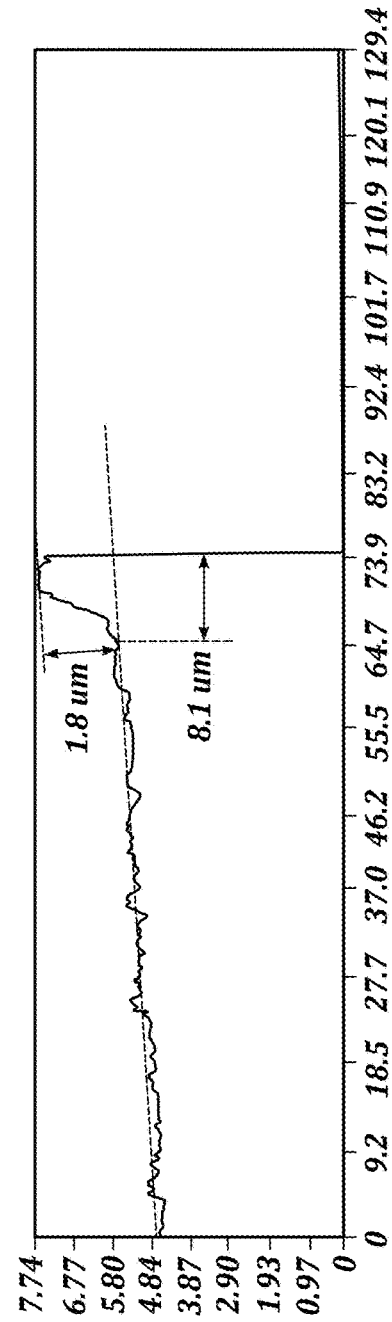

An aluminum alloy foil having a thickness of 63.5 microns was laser drilled by AOFemto GR laser with circular holes having a hole diameter of 0.2 mm at a throughput of about 100 holes per second with a laser power of about 20 W. See FIG. 7 showing a plurality of laser drilled holes at magnification. FIG. 8 shows the edge quality of the holes at a magnification of about 500×. FIG. 9 shows a cross-sectional view of some of the holes through the metal foil at magnification. FIGS. 10A and 10B show the edge profile of a drilled hole, and the results indicate volcano height near the drilling edge is up to 1.8 microns with a width of about 8.1 microns. As seen in FIG. 8, the heat-affected zone (HAZ) of the holes is less than 6.

Example 2: UV Laser Drilling

Figure 11:
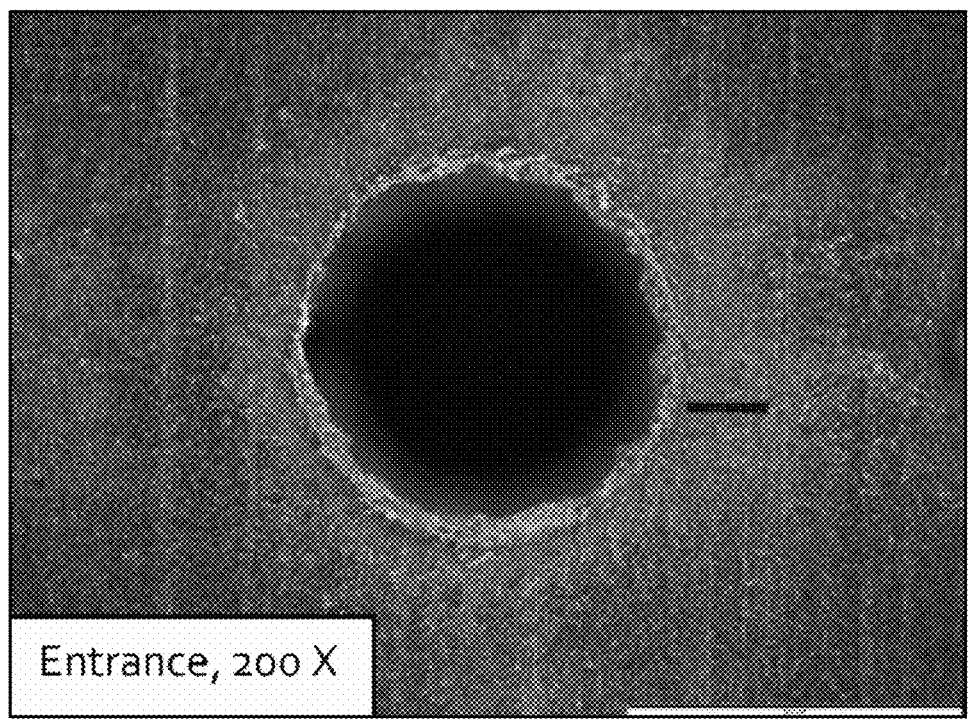
FIGS. 11-14B are magnified images of representative holes drilled using a representative UV laser drilling process.
Figure 12:
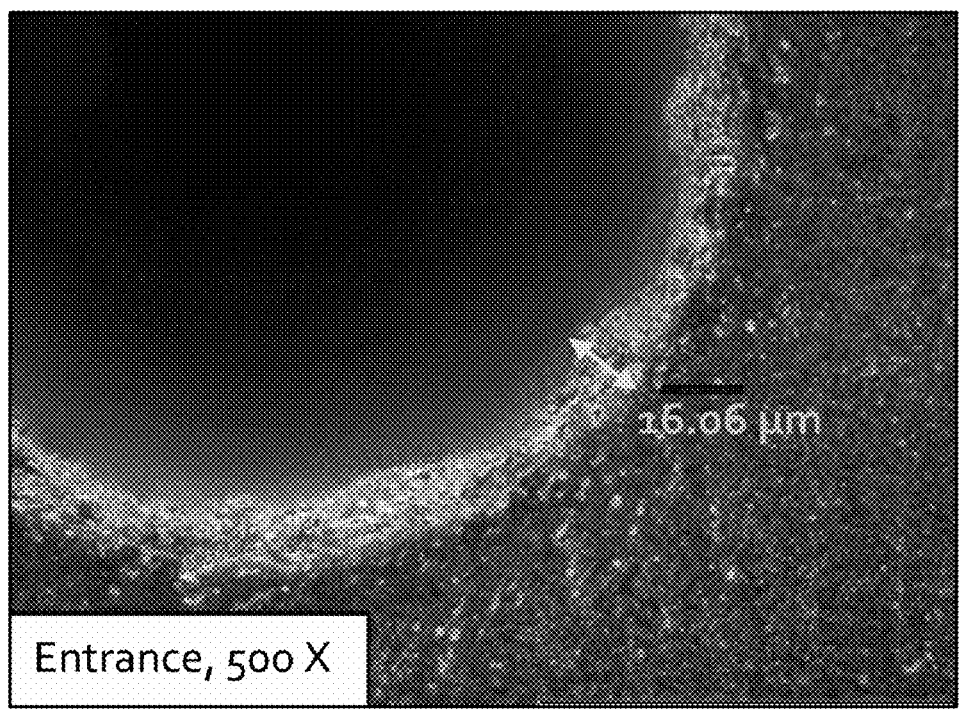
Figure 13:
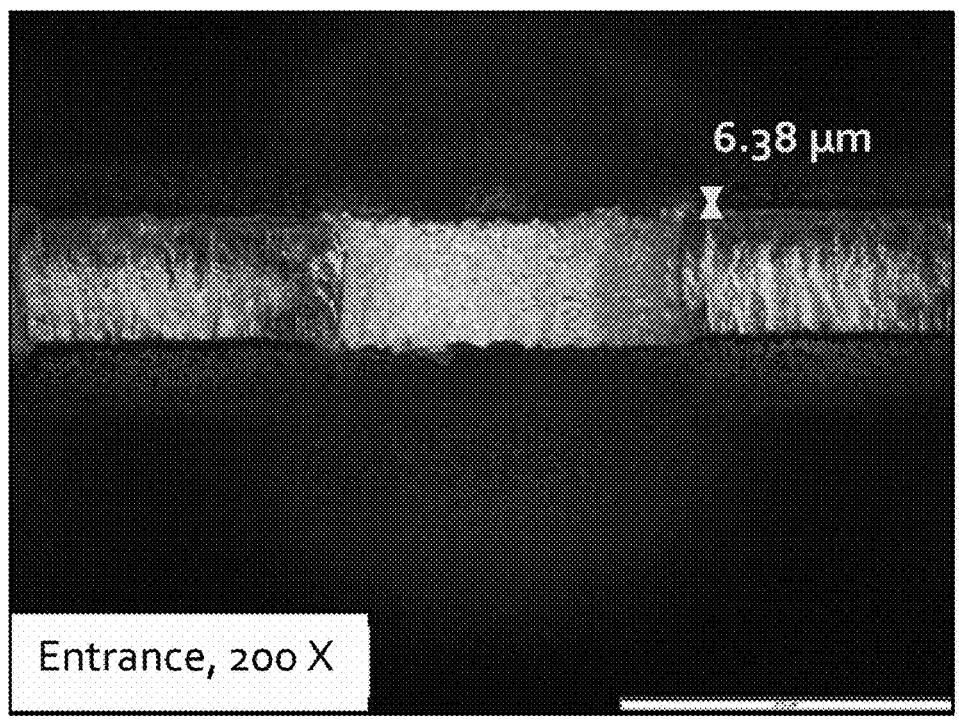
Figure 14A:
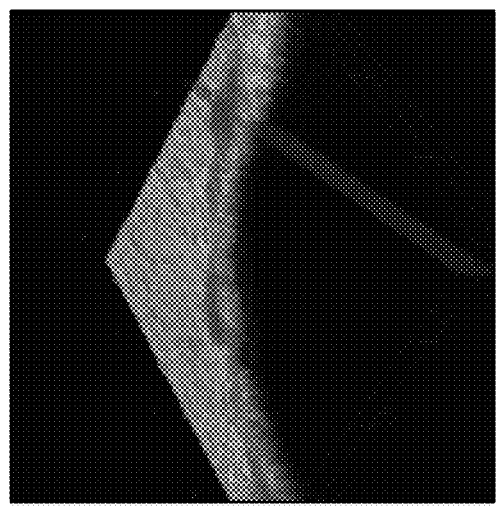
Figure 14B:
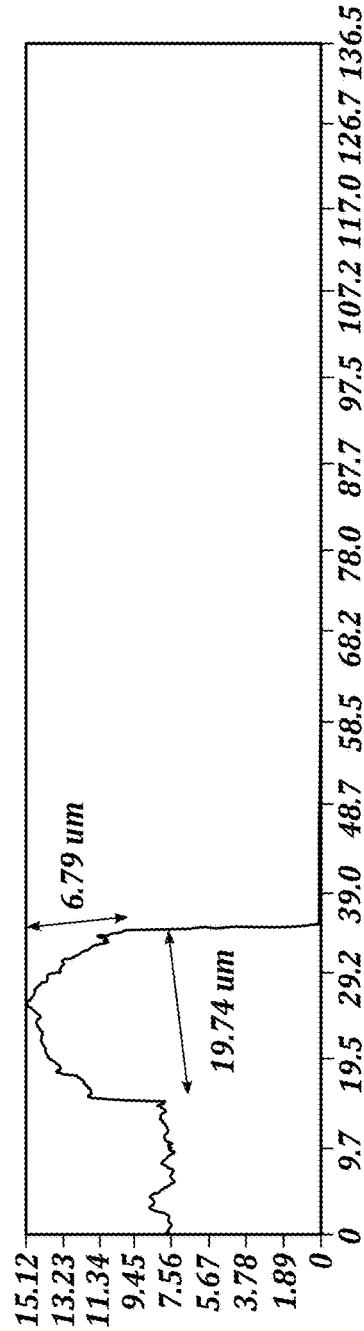

An aluminum alloy foil having a thickness of 63.5 microns was laser drilled by AOFemto GR laser with circular holes having a hole diameter of 0.2 mm at a throughput of about 210 holes per second with a laser power of about 24 W. FIG. 11 shows the edge quality of the holes at a magnification of 200×. FIG. 12 shows the edge quality of a hole at a magnification of 500×. FIG. 13 shows a cross-sectional view of a hole through the metal foil at a magnification of about 200×. FIGS. 14A and 14B show the edge profile of a drilled hole, and the results indicate volcano height near the drilling edge is up to 6.79 microns with a width of about 19.74 microns. As seen in FIG. 12, the heat-affected zone (HAZ) of the holes is less than 17.

Example 3: IR Laser Drilling

Figure 15A:
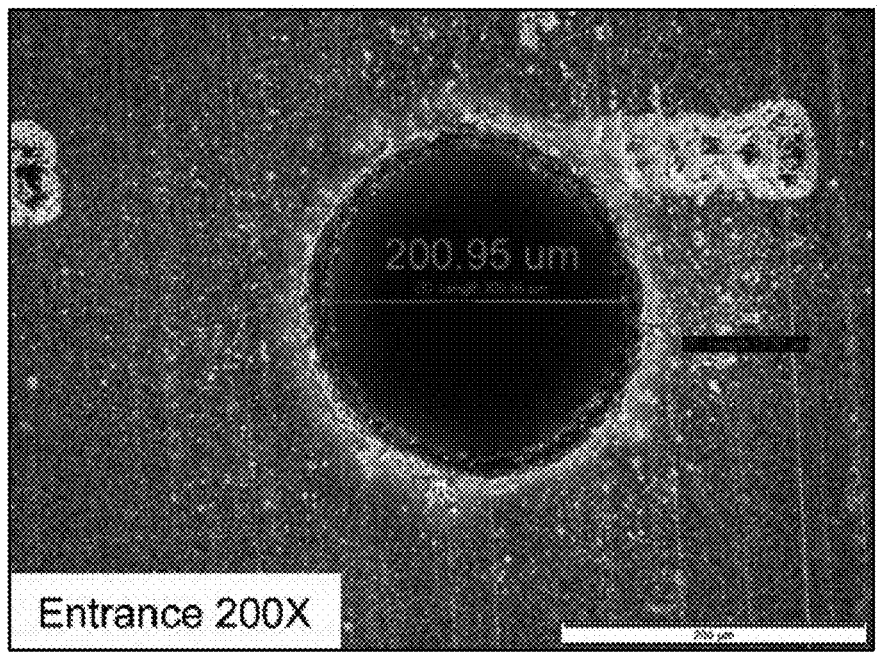
FIGS. 15A-17B are magnified images of representative holes drilled using a representative IR laser drilling process.
Figure 15B:
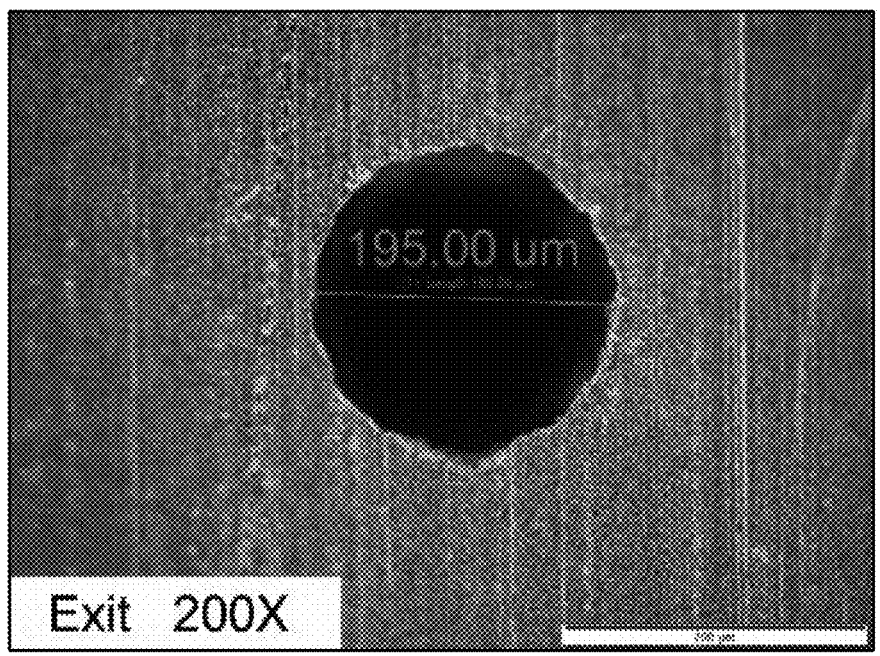
Figure 16:
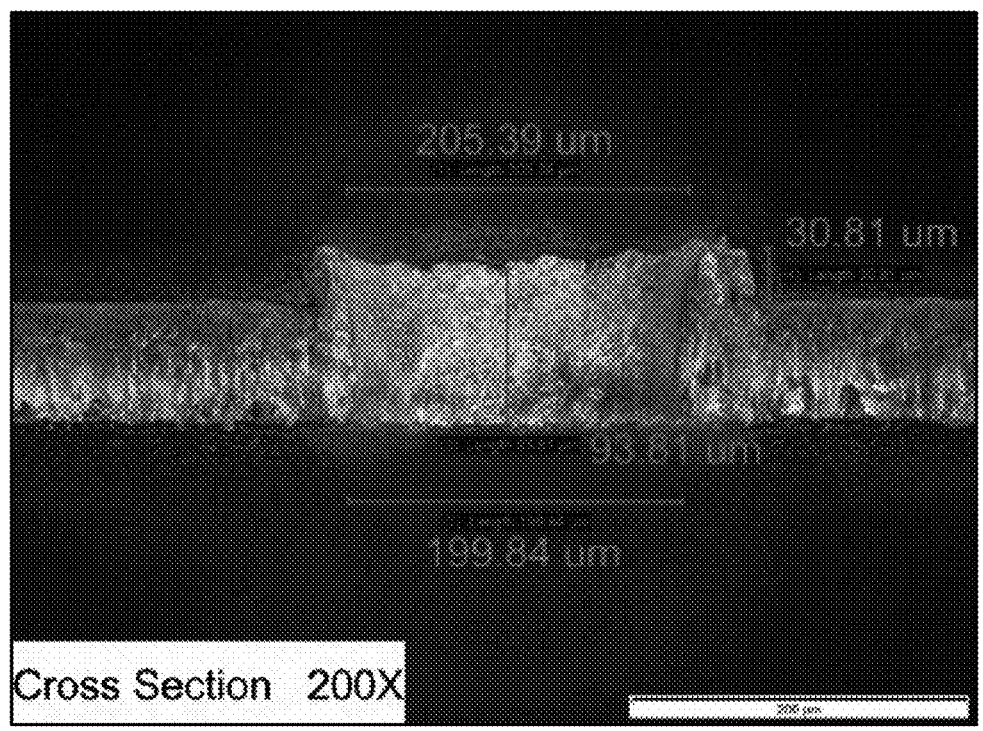
Figure 17A:
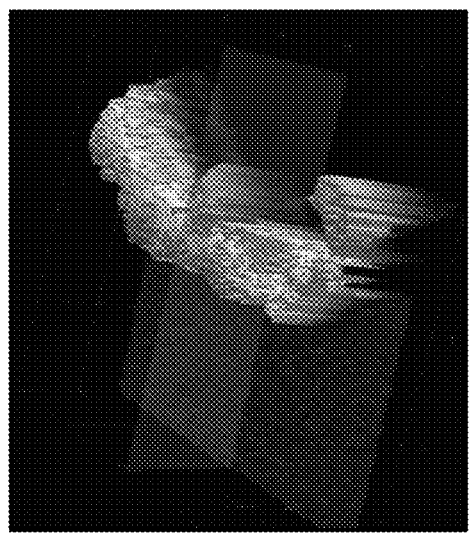
Figure 17B:
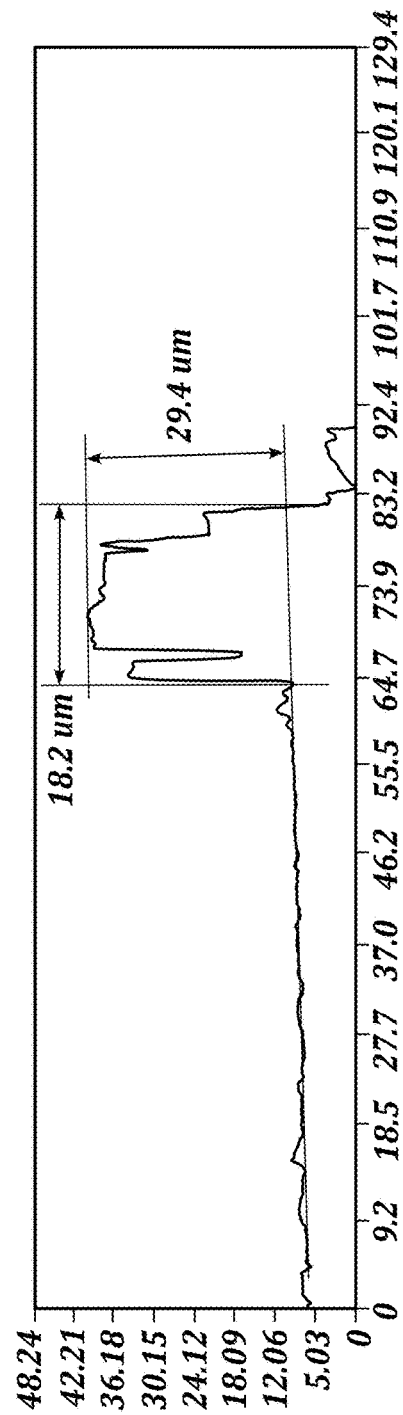

An aluminum alloy foil having a thickness of 63.5 microns was laser drilled by AONano IR laser with circular holes having a hole diameter of 0.2 mm at a throughput of about 500 holes per second with a laser power of about 100 W. FIGS. 15A and 15B shows the edge quality of the holes at a magnification of 200× at the entrance and exit of the holes. FIG. 16 shows a cross-sectional view of a hole through the metal foil at a magnification of about 200×. FIGS. 17A and 17B show the edge profile of a drilled hole, and the results indicate volcano height near the drilling edge is up to 29.4 microns with a width of about 18.2 microns. The heat-affected zone (HAZ) of the holes is less than 17 (not shown).

Example 4: Laser Drilling Comparison

Comparative results for IR, UV, and GR laser drilling for hole drilling on Al alloy foil (thickness 63.5 μm) by different laser sources.

| Laser source | Expected throughput @ Laser power (hole diameter 0.2 mm) | HAZ (μm) | Volcano (height × width, μm) |
|---|---|---|---|
| AONano IR | ~500 holes/s @ 100 W | ~17 | ~30 × 18 |
| AONano UV | ~210 holes @ 24 W | ~17 | ~20 × 7 |
| AOFemto GR | ~100 holes @ 20 W | <6 | ~1.8 × 8.1 |

Example 5: Mechanical Pin Perforation Results

FIGS. 18-20 are photographs of mechanical pin perforation results using the previously developed process of FIG. 6. FIG. 18 shows a 0.0038 in (0.096 mm) diameter perforation. FIG. 19 shows a 0.0019 in (0.048 mm) diameter perforation, where the rolling process partially reclosed the hole, which would result in reduced airflow. FIG. 20 shows a dimple with no resulting perforation.

While illustrative embodiments have been illustrated and described, it will be appreciated that various changes can be made therein without departing from the spirit and scope of the disclosure, as well as the claimed subject matter.

The embodiments of the invention in which an exclusive property or privilege is claimed are defined as follows:

1. A method of manufacturing perforated metal honeycomb material, the method comprising:
   printing a roll of metal foil with lines of adhesive;
   laser perforating the roll of metal foil to provide a plurality of holes in the metal foil;
   after laser perforating, sheeting the printed and perforated roll of metal foil into a plurality of stacked sheets, wherein the lines of adhesive of each sheet are superposed with the lines of adhesive of a juxtaposed sheet; and
   laminating the sheets of metal foil into a honeycomb before expansion block (HOBE).

2. The method of claim 1, further comprising cutting the HOBE block into a plurality of HOBE slices.

3. The method of claim 2, further comprising expanding the HOBE slices into expanded honeycomb structures having a plurality of perforations.

4. The method of claim 1, wherein the roll of metal foil is printed with adhesive prior to laser perforation.

5. The method of claim 1, wherein the roll of metal foil is printed with adhesive after laser perforation.

6. The method of claim 1, wherein at least some of the plurality of holes are larger than 0.10 mm in diameter.

7. The method of claim 1, wherein at least some of the plurality of holes are non-uniform in size and/or shape.

8. The method of claim 1, wherein a spacing between at least some of the plurality of holes is non-uniform.

9. The method of claim 1, further comprising corrugating the roll of metal foil to produce a corrugated honeycomb structure.

10. The method of claim 1, wherein the method of manufacturing perforated metal honeycomb material does not include the process step of compression of the metal foil after the perforation process step.

11. A method of manufacturing perforated metal honeycomb material, the method comprising:
   printing a roll of metal foil with lines of adhesive;
   laser perforating the roll of metal foil to provide a plurality of holes in the metal foil;
   after laser perforating, sheeting the printed and perforated roll of metal foil into a plurality of stacked sheets, wherein the lines of adhesive of each sheet are superposed with the lines of adhesive of a juxtaposed sheet;
   laminating the sheets of metal foil into a honeycomb before expansion block (HOBE);
   cutting the HOBE block into a plurality of HOBE slices; and
   expanding the HOBE slices into expanded honeycomb structures having a plurality of perforations.

12. The method of claim 1, where the holes produced by laser perforating have a volcano height of less than or about 30 μm.

13. The method of claim 1, where the holes produced by laser perforating have a volcano height of less than or about 20 μm.

14. The method of claim 1, where the holes produced by laser perforating have a volcano height of less than or about 1.8 μm.

15. The method of claim 1, where the holes produced by laser perforating have a volcano height of about 1.8 μm to about 30 μm.

16. The method of claim 1, where the laser perforating comprises using a nano IR laser.

17. The method of claim 1, where the laser perforating comprises using a nano UV laser.

18. The method of claim 1, where the laser perforating comprises using a femto Green laser.

* * * * *